3,211,765
PROCESS FOR THE PREPARATION OF 6-METHYL REICHSTEIN S

J Allan Campbell and John C. Babcock, Kalamazoo, Mich., assignors to The Upjohn Company, Kalamazoo, Mich., a corporation of Delaware
No Drawing. Filed July 30, 1962, Ser. No. 213,123
6 Claims. (Cl. 260—397.47)

This application relates to novel 6β,17α,21-trihydroxy-6α-methyl-4-pregnene-3,20-diones, 17α,21-dihydroxy-6-methyl-4,6-pregnadiene-3,20-diones, the corresponding 1-dehydro compounds the 21-acylates thereof and to processes for the production thereof.

This application is a continuation-in-part of copending application Serial No. 60,559, filed October 5, 1960, now U.S. 3,143,556 wherein the starting materials for the process of this invention, 6β,17α-dihydroxy-6α-methyl-4-pregnene-3,20-dione and 6β,17α-dihydroxy-6α-methyl-1,4-pregnadiene-3,20-dione are disclosed.

The compounds and process of this invention are illustratively represented by the following sequence of formulae:

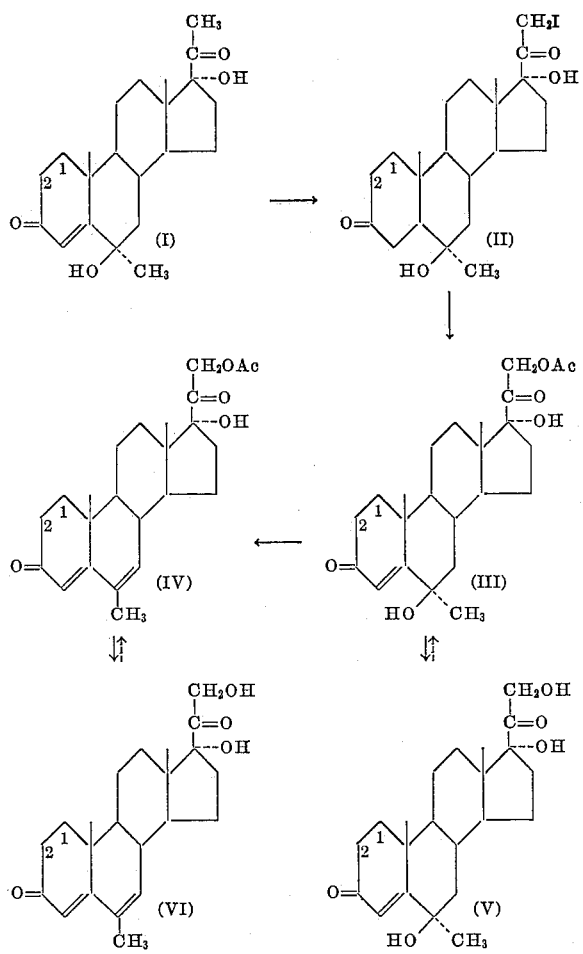

wherein Ac is the acyl radical of an organic carboxylic acid preferably a hydrocarbon carboxylic acid containing from 1 to 12 carbon atoms, inclusive and the 1,2-carbon atom linkage is a single bond linkage or a double bond linkage.

The compounds of this invention represented by Formulae III, IV, V and VI, are useful progestational, anti-inflammatory, gonadotropin inhibiting, ACTH-inhibiting, and antifertility agents.

The novel compounds of this invention can be prepared and administered to birds and mammals, including valuable domestic animals, in a wide variety of oral or parenteral dosage forms singly, or in admixture with other coacting compounds. They can be associated with a pharmaceutical carrier which can be a solid material, e.g., starch, lactose, talc, calcium stearate, etc., or a liquid, e.g., water, ethanol, mixtures thereof, corn oil, etc., in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspension, syrups, or elixirs. The novel compounds can also be administered topically in the form of ointments, creams, lotions, and the like, with or without coacting antibiotics, germicides or other materials forming advantageous compositions therewith.

The process of this invention comprises: (a) treating a compound of Formula I with iodine in the presence of calcium oxide and calcium chloride in methanol to produce the corresponding 21-iodo compound (II); (b) treating the 21-iodo compound thus obtained with an alkali metal acylate to produce the corresponding 21-acylate (III) and (c) dehydrating the 21-acylate thus obtained with a dehydrating agent, e.g., with thionyl chloride in the presence of pyridine or with a mineral or a Lewis acid in a polar organic solvent to produce the corresponding 6-dehydro compound (VI). The compounds of Formulae III and IV can be hydrolyzed to the corresponding 21-free hydroxy compounds, (V) and (VI), respectively and these in turn can be re-esterified to produce the corresponding 21-acylates (III) and (IV), respectively.

According to the process of this invention 6β,17α-dihydroxy-6α-methyl-4-pregnene-3,20-dione (I) or 6β,17α-dihydroxy-6α-methyl-1,4-pregnadiene-3,20-dione (I) is treated with iodine in the presence of calcium oxide and calcium chloride in methanol to produce the corresponding 21-iodo compound (II) which can be separated from the reaction mixture by conventional methods, e.g., precipitation with water and collection on a filter or centrifuge.

The 21-iodo compound thus obtained is then taken up in a suitable organic solvent, e.g., acetone, methyl ethyl ketone, t-butanol, dimethylformamide and the like, and treated with the alkali metal salt of an organic carboxylic acid, preferably a hydrocarbon carboxylic acid, in accordance with the procedure disclosed in U.S. Patent 2,726,240, e.g., with the alkali metal salt of an acid hereinafter listed in Example 1. The 21-acylate thus obtained is recovered from the reaction mixture and purified by conventional methods as disclosed in U.S. Patent 2,726,240, e.g., by diluting the reaction mixture with water, extracting with a water-immiscible solvent; and recovering the product (III) from the organic layer by evaporation of the solvent. The product (III) can then be further purified by conventional methods such as chromatography and/or recrystallization.

The 21-acyloxy compounds of Formula III are then dehydrated with thionyl chloride in the presence of pyridine at a temperature range of −50° to +50° C. or with a mineral or a Lewis acid in a polar organic solvent, e.g., hydrochloric acid in acetic acid, to give the corresponding 6-dehydro compound of Formula IV, which can likewise be recovered from the reaction mixture by conventional methods, e.g., by precipitation from water followed by purification by recrystallization from a suitable organic solvent, e.g., ethyl acetate, acetone-Skellysolve B hexanes, methylene chloride, acetone and the like.

The 21-acyloxy compounds of Formulae III and IV can be hydrolyzed in accordance with methods known in the art, e.g., the hydrolysis of hydrocortisone acetate to hydrocortisone, to give the corresponding 21-free hydroxy compounds of Formulae V and VI, respectively.

The 21-free hydroxy compounds of Formulae V and VI thus obtained, can be re-esterified under conventional 21-acylation conditions, for example, using the appropriate anhydride or acid halide of an organic carboxylic acid, preferably of a hydrocarbon carboxylic acid, e.g., the acids listed in Example 1, below.

Alternatively, the $\Delta^{1,4}$ and $\Delta^{1,4,6}$-compounds of Formulae III, IV, V and VI, can be produced by 1,2-dehydrogenation of the corresponding $\Delta^4$ and $\Delta^{4,6}$ compounds of Formulae III, IV, V and VI by fermentative or chemical dehydrogenation. Fermentative dehydrogenation comprises the use of organisms such as Septomyxa, Corynebacterium, Didymella, Calonectria, Alternaria, Colletotrichum, Cylindrocarpon, Ophiobolus, Fusarium, Listeria, Erysipelothrix, Mycobacterium, Trichothecium, Leptosphaeria, Curcurbitaria, Nocardia, enzymes of fungi of the family Tuberculariaceae and the like, under fermentation conditions well known in the art, e.g., U.S. Patents 2,902,410 and 2,902,411. When the $\Delta^4$ and $\Delta^{4,6}$-21-acylates of Formulae III or IV are used as the starting steroids, the 21-ester group is generally saponified during the fermentation process giving the corresponding 1-dehydro 21-free hydroxy compound which can be re-esterified in the manner previously described.

Chemical 1,2-dehydrogenation can be carried out with selenium dioxide according to procedures well known in the art [Meystre et al., Helv. Chim. Acta, 39, 734 (1956)].

The following examples are illustrative of the products and process of this invention.

*Example 1.—6β,17α,21-trihydroxy-6α-methyl-4-pregnene-3,20-dione 21-acetate (III)*

To a solution of 3.1 g. of 6β,17α-dihydroxy-6α-methyl-4-pregnene-3,20-dione (I) in 200 ml. of 5% calcium chloride in methanol was added 3.45 g. of calcium oxide followed by dropwise addition of 2.62 g. of iodine in 86 ml. of a solution of 10% calcium chloride in methanol. The iodine was added as rapidly as the iodine color disappeared. The 6β,17α-dihydroxy-6α-methyl-21 - iodo - 4-pregnene-3,20-dione (II) thus obtained was precipitated with water, filtered, washed with water, dissolved in methylenechloride, dried over magnesium sulfate and filtered. The filtrate was concentrated to dryness under a stream of nitrogen. The residual 6β,17α-dihydroxy-6α-methyl-21-iodo-4-pregnene-3,20-dione (II) thus obtained was taken up in 50 ml. of acetone and refluxed with 8 g. of potassium acetate under nitrogen for 8 hours. Most of the solvent was then boiled off, water was added to the concentrate and the product extracted with methylene chloride. The extract thus obtained was washed with water, dried over magnesium sulfate, concentrated to about 10 ml., combined with a similar 0.36 g. run and poured onto a 150 g. Florisil column packed wet with Skellysolve B and eluted by gradient elution (400 ml. fractions) between 5 l. of 5% acetone-Skellysolve B hexanes and 5 l. of 15% acetone-Skellsolve B hexanes.

The fractions 23–29 containing the desired product, as determined by infrared analysis, were combined and recrystallized from acetone-Skellysolve B hexanes to give 0.6 g. of 6β,17α,21-trihydroxy-6α-methyl-4-pregnene-3,20-dione 21-acetate, M.P. 205–208° C. A second crop was obtained from the mother liquors and recrystallized from ether-methylene chloride to give the same product, M.P. 210–215° C., which was combined with 100 mg. of the first crop and again recrystallized from acetone-Skellysolve B hexanes to give 265 mg. of 6β,17α,21-trihydroxy-6α-methyl-4-pregnene-3,20-dione 21-acetate (III) M.P. 218–226° C.

In the same manner other 21-acylates of 6β,17α,21-trihydroxy-6α-methyl-4-pregnene-3,20-dione (III) are prepared by reacting 6β,17α-dihydroxy-6α-methyl-21-iodo-4-pregnene-3,20-dione (II) with the appropriate alkali metal acylate, in place of the potassium acetate in Example 1, including, those in which the acyl radical is that of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethyl-isovaleric, a cyclic acid, e.g., cyclopropylideneacetic, a cycloaliphatic acid, e.g., cyclopentylformic, cyclopentylacetic, β - cyclopentylpropionic, cyclohexylformic, cyclohexylacetic, β-cyclohexylpropionic, an aryl or alkaryl acid, e.g., benzoic, 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6 - triethylbenzoic, α - naphthoic, 3-methyl-α-napthoic, an aralkyl acid, e.g., phenylacetic, phenylpropionic, diphenylacetic, triphenylacetic acid, a dibasic acid (the ester of which can be converted, e.g., to a sodium salt), e.g., succinic acid.

*Example 2.—6β,17α,21-trihydroxy-6α-methyl-1,4-pregnadiene-3,20-dione 21-acetate (III)*

To a solution of 3.0 g. of 6β,17α-dihydroxy-6α-methyl-1,4-pregnadiene-3,20-dione (I) in about 250 ml. of 5% calcium chloride in methanol is added 3.45 g. of calcium oxide followed by the dropwise addition of about 2.6 g. of iodine in 86 ml. of a 10% calcium chloride in methanol solution. The iodine solution is added as rapidly as the iodine color disappears. After all of the iodine has been added, water is added to the reaction mixture and the precipitate thus obtained is filtered, washed with water, dissolved in methylene chloride, dried over anhydrous magnesium sulfate and filtered. The filtrate thus obtained is concentrated to dryness under a stream of nitrogen to give a residue of 6β,17α-dihydroxy-6α-methyl-21-iodo-1,4-pregnadiene-3,20-dione (II), which is then taken up in about 50 ml. of acetone and refluxed with 8 g. of potassium acetate under nitrogen for about 8 hours. Most of the solvent is then removed, water is added and the product, 6β,17α,21-trihydroxy-6α-methyl-1,4-pregnadiene-3,20-dione 21-acetate is extracted with methylene chloride. The extract is washed with water, dried over magnesium sulfate, concentrated to about 10 ml., poured into a 150 g. column of Florisil (synthetic magnesium silicate) packed wet with Skellysolve B hexanes and eluted by gardient elution (400 ml. fractions) between 5 l. of 5% acetone-Skellysolve B hexanes and 5 l. of 15% acetone-Skellysolve B hexanes. The fractions containing the desired product as determined by infrared analysis are combined and recrystallized from acetone-Skellysolve B hexanes to give 6β,17α,21-trihydroxy-6α-methyl-1,4-pregnadiene-3,20-dione 21-acetate (III), a light colored crystalline solid.

In the same manner other 21-acylates of 6β,17α,21-trihydroxy-6α-methyl-1,4-pregnadiene-3,20-dione (III) are prepared by reacting 6β,17α-dihydroxy-6α-methyl-21-iodo-1,4-pregnadiene-3,20-dione (II) with the appropriate alkali metal acylate in place of the potassium acetate in Example 2, including those in which the acyl radical is that of, for example, an acid listed in Example 1, above.

*Example 3.—6-methyl-17α,21-dihydroxy-4,6-pregnadiene-3,20-dione 21-acetate (IV)*

To a solution of 80 mg. of 6β,17α,21-trihydroxy-6α-methyl-4-pregnene-3,20-dione 21-acetate (III) in about 0.5 ml. of pyridine is added 0.03 ml. of thionyl chloride with cooling in an ice-bath. After a period of about 13 minutes the reaction mixture is poured into water. The precipitate thus obtained is collected on a filter, washed with water, dilute hydrochloric acid and again with water and dried to give 6-methyl-17α,21-dihydroxy-4,6-pregnadiene-3,20-dione 17-acetate (V), a light colored crystalline solid which can be further purified by recrystallization from a suitable organic solvent, e.g., ethyl acetate.

*Example 4.—6-methyl-17α,21-dihydroxy-4,6-pregnadiene-3,20-dione 21-acetate (IV)*

A solution of 80 mg. of 6β,17α,21-trihydroxy-6α- methyl-4-pregnene-3,20-dione 21-acetate (III) in 1.3 ml. of acetic acid and 0.2 ml. of concentrated hydrochloric acid is kept at room temperature (approximately 25° C.) for a period of about 4 hours. Water is then added and the precipitate thus obtained is collected on a filter, washed with water, dilute hydrochloric acid and again with water and dried to give 6-methyl-17α,21-dihydroxy-4,6-pregnadiene-3,20-dione 17-acetate (V), a light colored crystalline solid which can be further purified by recrystallization from a suitable organic solvent, e.g., ethyl acetate.

In the same manner substituting as the starting material in Example 3 or 4 other 21-acylates of 6β,17α,21-trihydroxy-6α-methyl - 4 - pregnene-3,20-dione (III), e.g., those in which the acyl radical is that of an acid listed in Example 1, above, is productive of the corresponding 6-methyl-17α,21-dihydroxy-4,6-pregnadiene - 3,20 - dione 21-acylate (IV).

*Example 5.—6-methyl-17α,21-dihydroxy-1,4,6-pregnatriene-3,20-dione 21-acetate (IV)*

To a solution of 80 mg. of 6β,17α,21-trihydroxy-6α-methyl - 1,4-pregnadiene-3,20-dione 21-acetate (III) in about 0.5 ml. of pyridine is added 0.03 ml. of thionyl chloride with cooling in an ice-bath. After a period of about 13 minutes the reaction mixture is poured into water. The precipitate thus obtained is collected on a filter, washed with water, dilute hydrochloric acid and again with water and dried to give 6-methyl-17α,21-dihydroxy-1,4,6-pregnatriene-3,20-dione 21-acetate (IV), a light colored crystalline solid, which can be further purified by recrystallization with a suitable organic solvent, e.g., ethyl acetate.

*Example 6.—6-methyl-17α,21-dihydroxy-1,4,6-pregnatriene-3,20-dione 21-acetate (IV)*

A solution of 80 mg. of 6β,17α,21-trihydroxy-6α-methyl-1,4-pregnadiene-3,20-dione 21-acetate (III) in 1.3 ml. of acetic acid and 0.2 ml. of concentrated hydrochloric acid is kept at room temperature (approximately 25° C.) for a period of about 4 hours. Water is then added and the precipitate thus obtained is collected on a filter, washed with water, dilute hydrochloric acid and again with water and dried to give 6-methyl-17α,21-dihydroxy-1,4,6-pregnatriene-3,20-dione 21-acetate (IV), a light colored crystalline solid, which can be further purified by recrystallization from a suitable organic solvent, e.g., ethyl acetate.

In the same manner substituting as the starting material in Examples 5 or 6 other 21-acylates of 6β,17α,21-trihydroxy-6α-methyl-1,4-pregnadiene-3,20-dione (III), e.g., those in which the acyl radical is that of an acid listed in Example 1, above, is productive of the corresponding 6 - methyl-17α,21-dihydroxy-1,4,6-pregnatriene-3,20-dione 21-acylate (IV).

*Example 7.—6β,17α,21-trihydroxy-6α-methyl-4-pregnene-3,20-dione (V)*

A solution of 0.5 g. of 6β,17α,21-trihydroxy-6α-methyl-4-pregnene-3,20-dione 21-acetate (III) in about 50 ml. of methanol was purged with nitrogen and a solution of 0.26 g. of potassium bicarbonate in 5 ml. of water (also purged with nitrogen) was added. The solution was stirred for about 5 hours under nitrogen and then 0.6 ml. of acetic acid was added. Most of the solvent was removed under vacuum on the rotary evaporator. Water was added and the mixture was refrigerated. The precipitate thus obtained, was collected, washed with water and dried, to give 0.5 g. of 6β,17α,21-trihydroxy-6α-methyl-4-pregnene-3,20-dione, M.P. 233–243° dec. Recrystallization from methanol gave 0.3 g. of 6β,17α,21-trihydroxy-6α-methyl-4-pregnene-3,20-dione (V), M.P. 246–255° dec., $\lambda_{max}^{alc.}$ 238 mμ, ε=12,3000

Infrared analysis was agreeable with the proposed structure and only one spot was detected by papergram analysis.

*Analysis.*—Calcd. for $C_{22}H_{35}O_5$ (376.48): C, 70.18; H, 8.57. Found: C, 70.59; H, 8.54.

In the same manner other 21-acylates of 6β,17α,21-trihydroxy-6α-methyl-4-pregnene-3,20-dione (III) can be substituted for the 21-acetate to give 6β,17α,21-trihydroxy-6α-methyl-4-pregnene-3,20-dione (V).

In the same manner substituting as starting material 6β,17α,21 - trihydroxy - 6α - methyl-1,4-pregnadiene-3,20-dione 21-acetate (III); 6-methyl-17α,21-dihydroxy-4,6-pregnadiene-3,20-dione 21-acetate (IV); 6-methyl-17α,21-dihydroxy-1,4,6-pregnatriene-3,20-dione 21-acetate (IV) or other 21-acylates of these compounds, Example 5 is productive of the corresponding 21-free hydroxy compound, 6β,17α,21 - trihydroxy-6α-methyl-1,4-pregnadiene-3,20 - dione (V), 6-methyl-17α,21-dihydroxy-4,6-pregnadiene-3,20-dione (VI) and 6-methyl-17α,21-dihydroxy-1,4,6-pregnatriene-3,20-diode (VI), respectively.

*Example 8.—6β,17α,21-trihydroxy-6α-methyl-4-pregnene-3,20-dione 21-acetate (III)*

A solution of 100 mg. of 6β,17α,21-trihydroxy-6α-methyl-4-pregnene-3,20-dione (V) in 1 ml. of pyridine and 1 ml. of acetic anhydride was maintained at room temperature for about 17 hours. Crushed ice and water was added and the 6β,17α,21-trihydroxy-6α-methyl-4-pregnene-3,20-dione 21-acetate thus obtained was extracted with three 10 ml. portions of methylene chloride. The methylene chloride extracts were dried over anhydrous sodium sulfate, evaporated and the residue recrystallized from acetone-Skellysolve B hexanes to give 6β,17α,21-trihydroxy - 6α-methyl-4-pregnene-3,20-dione 21-acetate (III), M.P. 230–237° C., $\lambda_{max}^{alc.}$ 238 mμ, ε=13,250

Infrared analysis showed the product to be identical to that obtained in Example 1.

In the same manner, substituting 6β,17α,21-trihydroxy-6α-methyl-1,4-pregnadiene-3,20-dione (IV), 6-methyl,17α,21-dihydroxy-4,6-pregnadiene-3,20-dione (VI) or 6-methyl - 17α,21 - dihydroxy-1,4,6-pregnatriene-3,20-dione (VI) as starting material, Example 6 is productive of 6β,17α,21-trihydroxy - 6α-methyl-1,4-pregnadiene-3,20-dione 21-acetate (III), 6-methyl-17α,21-dihydroxy-4,6-pregnadiene-3,20-dione 21-acetate (IV) and 6-methyl-17α,21-dihydroxy-1,4,6-pregnatriene-3,20-dione 21-acetate (IV), respectively.

Similarly, 6β,17α,21 - trihydroxy-6α-methyl-4-pregnene-3,20-dione and the other starting materials named in the preceding paragraph are converted, by esterification of the 21-hydroxy group, e.g., by reaction with the appropriate acid anhydride, acid chloride or bromide, ester by ester exchange, acid in the presence of an esterification catalyst, etc., to other 21-acylates including those wherein the acyl group is the acyl radical of, for example, the acids listed in Example 1.

What we claim is:

1. The process which comprises: (a) treating a compound of the formula:

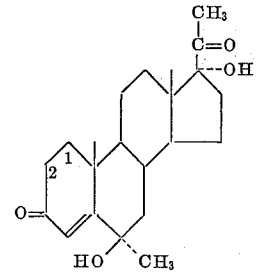

wherein the 1,2-carbon atom linkage is selected from the linkages consisting of a single bond linkage and a double bond linkage, with iodine in the presence of calcium oxide and calcium chloride in methanol to produce the corresponding 21-iodo compound; (b) treating the 21-iodo compound thus obtained with an alkali metal salt of an organic carboxylic acid to produce the corresponding 21-acylate of the formula:

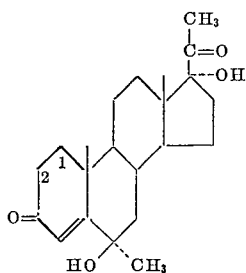

wherein R is the acyl radical of an organic carboxylic acid containing from 1 to 12 carbon atoms, inclusive, and the 1,2-carbon atom linkage is defined as above and (c) dehydrating the 21-acylate thus obtained with a dehydrating agent selected from the group consisting of thionyl chloride in the presence of pyridine, and a Lewis acid in a polar organic solvent to produce the corresponding 6-dehydro compound of the formula:

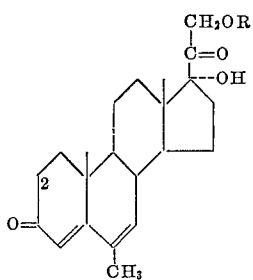

wherein R and the 1,2-carbon atom linkage are defined as above.

2. The process which comprises: (a) iodinating 6β,17α-dihydroxy-6α-methyl-1,4-pregnadiene-3,20-dione with iodine in the presence of calcium oxide and calcium chloride in methanol to produce 6β,17α-dihydroxy-6α-methyl-21-iodo-1,4-pregnadiene-3,20-dione; (b) acetylating the 21-iodo compound thus obtained with potassium acetate to produce 6β,17α,21-trihydroxy-6α-methyl-1,4-pregnadiene-3,20-dione and (c) dehydrating the latter compound with thionyl chloride in the presence of pyridine to produce 6-methyl-17α,21-dihydroxy-1,4,6-pregnatriene-3,20-dione 21-acetate.

3. The process which comprises: (a) iodinating 6β,17α-dihydroxy-6α-methyl-4-pregnene-3,20-dione with iodine in the presence of calcium oxide and calcium chloride in methanol to produce 6β,17α-dihydroxy-6α-methyl-21-iodo-4-pregene-3,20-dione; (b) acetylating the 21-iodo compound thus obtained with potassium acetate to produce 6β,17α,21-trihydroxy-6α-methyl-4-pregnene-3,20-dione and (c) dehydrating the latter compound with thionyl chloride in the presence of pyridine to produce 6-methyl-17α,21-dihydroxy-4,6-pregnadiene-3,20-dione 21-acetate.

4. The process which comprises dehydrating a compound of the formula:

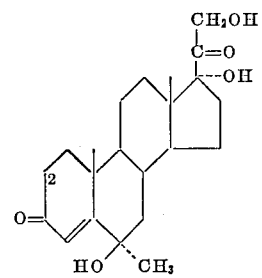

wherein R is the acyl radical of an organic carboxylic acid containing from 1 to 12 carbon atoms, inclusive, and the 1,2-carbon atom linkage is selected from the linkages consisting of a single bond linkage and a double bond linkage with a dehydrating agent selected from the group consisting of thionyl chloride in the presence of pyridine, and a Lewis acid in a polar organic solvent, to produce the corresponding 6-dehydro compound of the formula:

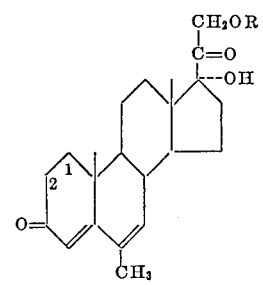

wherein R and the 1,2-carbon atom linkage are defined as above.

5. The process which comprises: dehydrating 6β,17α,21 - trihydroxy-6α methyl-4-pregnene-3,20-dione 21-acetate with thionyl chloride in the presence of pyridine to produce 17α,21-dihydroxy-6-methyl-4,6-pregnadiene-3,20-dione 21-acetate.

6. The process which comprises: dehydrating 6β,17α,21-trihydroxy-6α-methyl-1,4-pregnadiene-3,20 - dione 21-acetate with thionyl chloride in the presence of pyridine to produce 17α,21 - dihydroxy-6-methyl-1,4,6-pregnatriene-3,20-dione 21-acetate.

References Cited by the Examiner

UNITED STATES PATENTS

| | | | |
|---|---|---|---|
| 2,887,499 | 5/59 | Caravajal | 260—397.45 |
| 2,926,181 | 2/60 | Sondheimer et al. | 260—397.47 |
| 2,985,563 | 5/61 | Caravajal | 195—51 |
| 3,062,844 | 11/62 | Ellis | 260—397.3 |

FOREIGN PATENTS 786,019   11/57   Great Britain.

OTHER REFERENCES

Ringold et al., "Journ. Amer. Chem. Soc." (1959), vol. 81, pages 3712 and 3716 relied on.

LEWIS GOTTS, *Primary Examiner.*

UNITED STATES PATENT OFFICE
CERTIFICATE OF CORRECTION

Patent No. 3,211,765　　　　　　　　　　　　October 12, 1965

J Allan Campbell et al.

It is hereby certified that error appears in the above numbered patent requiring correction and that the said Letters Patent should read as corrected below.

Column 7, lines 26 to 39, the formula should appear as shown below instead of as in the patent:

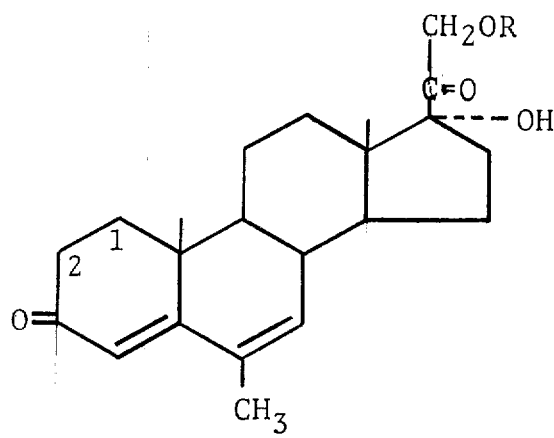

column 8, lines 3 to 14, the formula should appear as shown below instead of as in the patent:

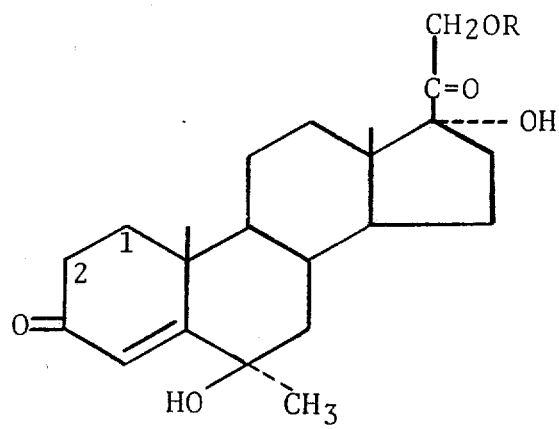

Signed and sealed this 18th day of October 1966.

(SEAL)
Attest:

ERNEST W. SWIDER　　　　　　　　　　　　EDWARD J. BRENNER
Attesting Officer　　　　　　　　　　　Commissioner of Patents